(12) United States Patent
Dukatz

(10) Patent No.: US 10,154,080 B2
(45) Date of Patent: Dec. 11, 2018

(54) ENHANCING DIGITAL CONTENT PROVIDED FROM DEVICES

(71) Applicant: Accenture Global Solutions Limited, Dublin (IE)

(72) Inventor: Carl Matthew Dukatz, San Jose, CA (US)

(73) Assignee: Accenture Global Solutions Limited, Dublin (IE)

( * ) Notice: Subject to any disclaimer, the term of this patent is extended or adjusted under 35 U.S.C. 154(b) by 256 days.

(21) Appl. No.: 15/161,471

(22) Filed: May 23, 2016

(65) Prior Publication Data

US 2017/0339213 A1    Nov. 23, 2017

(51) Int. Cl.
*G06N 5/02*    (2006.01)
*H04L 29/08*   (2006.01)

(52) U.S. Cl.
CPC .............. *H04L 67/06* (2013.01); *G06N 5/02* (2013.01)

(58) Field of Classification Search
CPC ..................... H04L 67/06; G06N 5/02
See application file for complete search history.

(56) References Cited

U.S. PATENT DOCUMENTS

| | | | | |
|---|---|---|---|---|
| 9,681,111 | B1* | 6/2017 | Newman | H04N 9/8205 |
| 2004/0135900 | A1* | 7/2004 | Pyle | H04N 1/00912 348/231.3 |
| 2005/0033760 | A1* | 2/2005 | Fuller | G06F 17/30247 |
| 2005/0104976 | A1* | 5/2005 | Currans | G06F 17/30265 348/231.5 |
| 2015/0186073 | A1* | 7/2015 | Pacurariu | G06F 3/0655 710/74 |
| 2016/0188181 | A1* | 6/2016 | Smith | G06F 3/048 715/765 |
| 2017/0212928 | A1* | 7/2017 | Abebe | G06F 17/30442 |
| 2017/0330037 | A1* | 11/2017 | Inoue | G06K 9/00671 |

* cited by examiner

*Primary Examiner* — Larry D Donaghue
(74) *Attorney, Agent, or Firm* — Fish & Richardson P.C.

(57) ABSTRACT

Implementations of the present disclosure include methods, systems, and computer-readable storage mediums for enhancing digital content provided from devices, and actions of providing, by a sensor of a device, primary digital content, providing, by the device, secondary digital content, the secondary digital content indicating a context, within which the primary digital content was generated, generating, by the device, a data package including the primary digital content and the secondary digital content, and transmitting, by the device, the data package to a back-end system over a network.

17 Claims, 3 Drawing Sheets

ENHANCING DIGITAL CONTENT PROVIDED FROM DEVICES

BACKGROUND

Machine learning refers to techniques for using computing systems to train predictive models that use past training examples to predict the outcome of future events that are similarly situated as the training examples. For example, machine learning can be used to train a predictive model, or for brevity, model, that predicts the market value of a house given particular attributes of the house (e.g., square footage, ZIP code, etc.). The attributes are referred to as features of the model. A collection of features associated with a single data point used to train the model is referred to as a training example.

In some examples, data that is generated by one or more devices is processed through one or more models in a cognitive computing environment. For example, a device can generate data (e.g., an image, a video, audio), which is processed by one or more features of the model to provide an output. Frequently, data (e.g., images, video, audio) are captured from mobile devices and/or remote devices. Information brought back from the devices is typically limited to the content of the sensor collection itself, as well as metadata associated with the data.

SUMMARY

Implementations of the present disclosure are generally directed to enhancing digital content provided from devices. In some implementations, actions include providing, by a sensor of a device, primary digital content, providing, by the device, secondary digital content, the secondary digital content indicating a context, within which the primary digital content was generated, generating, by the device, a data package including the primary digital content and the secondary digital content, and transmitting, by the device, the data package to a back-end system over a network. Other implementations of this aspect include corresponding systems, apparatus, and computer programs, configured to perform the actions of the methods, encoded on computer storage devices.

These and other implementations can each optionally include one or more of the following features: actions further include generating a checksum value based on the primary digital content and the secondary digital content; the data package further includes the checksum value; actions further include retrieving device state data from computer-readable memory of the device, the device state data indicating a state of the device when the primary digital content was captured, and at least a portion of the secondary digital content comprising the device state data; actions further include processing, by the device, at least a portion of the primary digital content to provide an output, at least a portion of the secondary digital content including the output; the back-end system executes a content review process in a cognitive computing environment based on the primary digital content and the secondary digital content; and one or more of a model and at least one feature of the model is selected for processing in the content review process based on the secondary digital content.

Implementations of the present disclosure provide one or more of the following advantages. In some examples, implementations of the present disclosure leverage the computing capabilities of distributed devices to decrease the computational requirements in central or cloud computing. This can lead to energy and costs savings in centralized computing environments. Additionally, in some implementations, context or information which would have otherwise only existed on the device creating the data would have only remained on that device and not made available for machine learning. In some cases, depending on the data captured, this can lead to better future product design or new or enhanced software application services.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
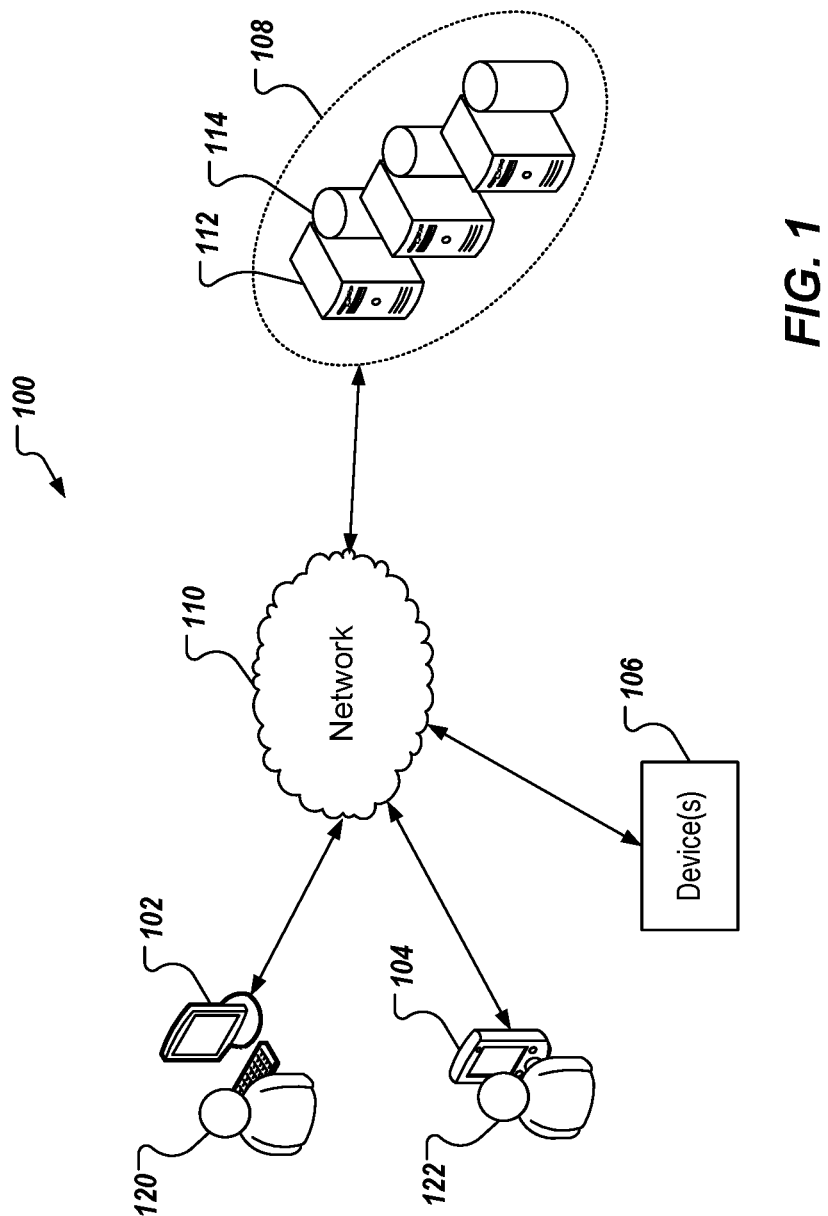
FIG. 1 depicts an example system that can execute implementations of the present disclosure.

Implementations of the present disclosure are generally directed to enhancing digital content provided from devices. More particularly, implementations of the present disclosure are directed to expanding primary digital content provided from a device by including secondary digital content. In some examples, the secondary digital content is provided from one or more other attributes of the device. Example other attributes can include one or more additional sensors (e.g., other than the sensor that generated the digital content), and/or device log files. In some examples, the secondary digital content provides more information indirectly related to the primary digital content being returned. For example, the secondary digital content can reflect a context, within which the primary digital content was provided. In some implementations, the secondary digital content can include real-time analytic model processing, or other processing conducted on the device.

Implementations of the present disclosure can be included in an example context. The example context includes content review optimization within a cognitive computing environment. It is contemplated, however, that implementations of the present disclosure can be realized in any appropriate context, and are not limited to the example context described herein.

As noted above, the example context includes content review optimization within a cognitive computing environment. In some examples, a content review process can include reviewing and acting on one or more entities. Example entities can include insurance claims, social media postings, warranty claims, and trouble tickets (e.g., in an information technology (IT) environment). An example content review process can include classification of entities using a machine-learning component, human review of a sub-set of classified entities provided from the machine-learning component, and action and/or feedback to the cognitive computing environment. In some examples, the machine-learning component processes one or more models to process input (e.g., information related to an entity), and provide output (e.g., one or more classifications related to the entity). In some examples, a model includes one or more features that are evaluated to provide an output. For example, a model can be provided to predict the market value of an asset (e.g., a house) given particular attributes of the house (e.g., square footage, ZIP code, location, etc.), where attributes of the asset are referred to as features of the model.

In accordance with implementations of the present disclosure, the provision of secondary digital content provides for enhancement of the cognitive computing process based on model selection, and/or feature selection. For example, if particular secondary digital content is provided from a device, a model that includes features based on the secondary digital content can be selected from a plurality of models. As another example, a feature of a model can be accounted for during processing of the model, if secondary digital content corresponding to the feature is available. In some examples, efficiency of the machine-learning component can be enhanced based on model selection, and/or feature selection in view of the secondary digital content. For example, an amount of resources (e.g., processors, memory, communication bandwidth) required by the machine-learning component can be reduced. In some examples, accuracy of the machine-learning component can be enhanced based on model selection, and/or feature selection. For example, an accuracy (e.g., correct classifications versus incorrect classifications) can be increased.

FIG. 1 depicts an example system 100 that can execute implementations of the present disclosure. The example system 100 includes computing devices 102, 104, one or more distributed devices 106, a back-end system 108, and a network 110.

In some examples, the network 110 includes a local area network (LAN), wide area network (WAN), the Internet, or a combination thereof, and connects web sites, user devices (e.g., the computing devices 102, 104), and back-end systems (e.g., back-end system 108). In some examples, the network 110 can be accessed over a wired and/or a wireless communications link. For example, mobile computing devices, such as smartphones can utilize a cellular network to access the network 110.

In the depicted example, the back-end system 108 includes at least one server system 112, and data store 114 (e.g., database). In some examples, the at least one server system 112 hosts one or more computer-implemented services that users can interact with using computing devices. For example, the server system 112 can host a computer-implemented service for a content review process, which can include reviewing and acting on one or more entities. An example content review process can include classification of entities using a machine-learning component/cognitive computing component executed by the back-end system 108.

In some examples, the computing devices 102, 104 can each include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In the depicted example, the computing device 102 is provided as a desktop computer that is used by a user 120. In some examples, the user 120 can include a human reviewer in an example content review process that includes classification of entities using a machine-learning component (e.g., executed by the back-end system 108), human review of a sub-set of classified entities provided from the machine-learning component (e.g., executed by the user 120 using the computing device 102), and action and/or feedback to the cognitive computing environment.

In the depicted example, the computing device 104 is provided as a mobile computing device (e.g., a smartphone) that is used by a user 122. In some examples, the user 122 can use the computing device 104 to provide a data package (including primary digital content and secondary digital content, as described in further detail herein) that is used in the example content review process. For example, the user 122 can include a customer, or insurance adjuster, who uses the computing device 104 to capture images and/or video of an insured asset (e.g., car, house). As another example, the user 122 can include an appraiser, who uses the computing device 104 to capture images and/or video of an asset (e.g., car, house) that is being appraised.

In some implementations, the one or more distributed devices 106 can each provide data packages (including primary digital content and/or secondary digital content, as described in further detail herein) that is used in the example content review process. Example distributed devices can include cameras (e.g., still, video, etc.), microphones, accelerometers, environmental sensors (e.g., temperature, pressure, moisture, wind, seismic activity, etc.), alarms (e.g., smoke, carbon monoxide, burglar, etc.), and other types of sensors (e.g., vehicle telemetry sensors). In some examples, distributed devices 106 can include fixed-position devices (e.g., street cameras, weather sensors, smoke/carbon monoxide alarms, burglar alarms, etc.). In some examples, distributed devices 106 can include mobile devices (e.g., drone-mounted devices, vehicle mounted devices, weather balloons, etc.). In some examples, each device 106 provides a data package (including primary digital content and secondary digital content, as described in further detail herein) that is used in the example content review process.

As introduced above, implementations of the present disclosure are generally directed to enhancing digital content provided from devices. More particularly, implementations of the present disclosure are directed to digital content that is used in cognitive computing environments, and expanding primary digital content provided from a device by including secondary digital content. In some implementations, a data package is provided that includes primary digital content and/or secondary digital content, the data package being processed during evaluation of a model within the cognitive computing environment. In some examples, the secondary digital content is provided from one or more other attributes of the device providing the primary digital content. Example other attributes can include one or more additional sensors (e.g., other than the sensor that generated the digital content), and device log files. In some examples, the secondary digital content provides more information about the primary digital content being returned. For example, the secondary digital content can reflect a context within which the primary digital content was provided. In some examples, the secondary digital content is provided from a device other than the device that provides the primary digital content.

In some implementations, the secondary digital content can include real-time analytic model matches conducted on the device. For example, a device can process at least a portion of a model being evaluated by the cognitive computing environment to provide an output, and the output can be provided as secondary digital content for further processing of the remainder of model within the cognitive computing environment.

In some implementations, a data package is processed to provide a checksum (or hash sum) value, which can be used to detect errors in the primary digital content and/or secondary digital content within the data package, which may have been introduced during transmission and/or storage, or tampering. In some examples, the checksum is provided as a relatively small-size datum from a block of digital data. For example, and in accordance with implementations of the present disclosure, the data package can be provided as input to a checksum function, which provides a checksum value based on the contents of the data package. Example checksum functions can include longitudinal parity check, modular sum, and position-dependent checksum. The checksum value can be used to determine whether changes have been made (e.g., due to error and/or tampering) by recalculating the checksum value. If the checksum value remains the same, there are no changes to the contents of the data package. If the checksum value is different, there are changes to the contents of the data package.

In accordance with implementations of the present disclosure, a device can be used to provide a data package, which includes primary digital content, and/or secondary digital content. In some implementations, a device generates primary digital content (e.g., image, video, audio), which is to be provided to be processed using a model in a content review process. The device also provides secondary digital content, which is indicative of the context, within which the primary digital content is generated. In some examples, the secondary digital content is In some implementations, the secondary digital content is distinct from metadata that may be provided with, or as part of the primary digital content. In some examples, metadata can be described as data about the primary digital content. In some examples, metadata can be used to organize the primary digital content, provide digital identification, and/or support archiving and preservation of the primary digital content. In some examples, metadata includes technical metadata (e.g., size, color profile, camera settings), descriptive metadata (e.g., captions, headlines, titles, keywords, location of capture), and/or administrative metadata (e.g., identity of the creator, contact information for the rights holder/licensor).

In contrast to metadata, the secondary digital content provides context around the primary digital content (and any metadata associated therewith). In some examples, the secondary digital content provides includes data indicative of the physical environment, within which the primary digital content was generated, and/or data indicative of the device used to generate the primary digital content. Using image capture as an example, a device can be used to capture an image and provide metadata associated with the image as primary digital content. In some examples, the device can include one or more other sensors that are responsive to a physical environment of the device (e.g., temperature, pressure, wind speed, moisture (rain/fog)) at the time that the primary digital content was created. In some examples, the device includes one or more log files that include data indicating a state of the device (e.g., operating system version, errors files, network device is connected to, network traffic, event log information, etc.) at the time that the primary digital content was created.

In some implementations, the secondary digital content can include data provided from a real-time analysis of the primary digital content and/or other secondary digital content. For example, the device can process at least a portion of a model that is used in a cognitive computing process based on the primary digital content and/or secondary digital content to provide an output, the output being provided as secondary digital content. A data package can be provided that includes the primary digital content, and the secondary digital content, which can also include the output.

For example, an image can be processed to detect the presence of an object (e.g., a face) within the image, and a location of the object within the image, and the output can include the object and location. A data package can be provided, which includes the primary digital content (e.g., the image and any associated metadata), and the secondary content (e.g., at least the output). A checksum value can be determined based on the data package, and the data package and checksum value are provided to a back-end system for further processing (e.g., transmitted from the device that generated the image to a server system that performs a cognitive computing process). In some examples, the output is used to increase the efficiency of the further processing. For example, because the output already indicates an object and a location of the object, the back-end system need not process the object for object detection (e.g., facial detection). In this manner, computing resources (e.g., processors, memory, bandwidth) of the back-end system are conserved. Accordingly, the back-end system can conduct further processing of the primary digital content based on the output (e.g., conduct facial recognition on faces already detected at particular locations within the image, as indicated by the output).

Figure 2:
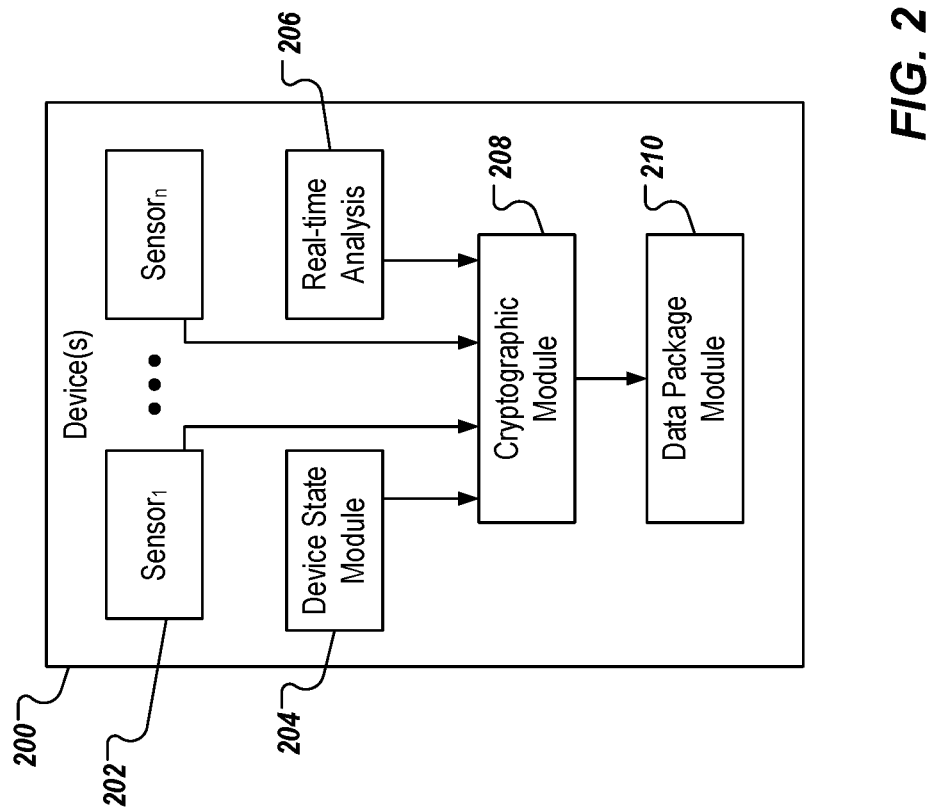
FIG. 2 depicts an example device.

FIG. 2 depicts an example device 200. In the depicted example, the device 200 includes one or more sensors 202, a device state module 204, a real-time analysis module 206, a cryptographic module 208, and a data package module 210.

In some examples, each sensor 202 can be provided as a physical sensor (e.g., camera, microphone, compass, accelerometer, temperature sensor, pressure sensor, etc.) that is responsive to a physical environment and/or movement of the device, and can include one or more underlying software modules that provide the primary digital content based on the physical sensor. For example, the sensor can include a camera and one or more software modules that provide digital image/video files. In some implementations, one or more of the sensors 202 can provide the primary digital content, while one or more of the sensors 202 can provide secondary digital content. For example, the sensors 202 can include a camera, a microphone, and an accelerometer. The camera and microphone can be used to provide a digital video (with audio), as the primary digital content, and the accelerometer can be used to provide data indicative of movement of the device while capturing the video, as secondary digital content.

In some examples, the device state module 204 maintains one or more states of the device 200. For example, the device state module 204 can record and/or access an event log that indicates one or more events occurring to the device (e.g., operating system updates, error files, etc.), which indicate a state of the device 200. In some examples, the device state module 204 is provided as one or more computer-executable programs.

In some implementations, the real-time analysis module 206 is optional. For example, the device 200 includes the real-time analysis module 206, in cases where the device 200 is to execute at least a portion of the processing of the primary digital content. An example of this is described above with reference to facial detection in an image. In some examples, the real-time analysis module 206 is provided as one or more computer-executable programs.

In some implementations, the cryptographic module 208 processes the primary digital content and the secondary digital content to provide a checksum value. For example, the cryptographic module 208 provides the primary digital content and the secondary digital content as input to a checksum function, which outputs the checksum value. In some examples, the cryptographic module 208 is provided as one or more computer-executable programs.

In some implementations, the data package module 210 provides a data package based on the primary digital content and the secondary digital content. In some examples, the data package module 210 signs the data package and provides the data package for transmission (e.g., to a back-end system). In some examples, digitally signing the package is a mathematical method for demonstrating authenticity of the package. This enables the receiver to validate the sender, the sender cannot deny that the message was sent from them (non-repudiation), and can be used to confirm that the message integrity was sustained during the transit of the message through other systems, if required.

In some implementations, if the checksum value has been provided, the data package includes the checksum value. In some implementations, the data package can first be provided based on the primary digital content and the secondary digital content, then the data package can be provided as input to the cryptographic module 208, which provides the checksum value based on the data package. The data package and the checksum value are transmitted to the back-end system.

It is appreciated that the example components of the device 200 are not exhaustive of components that can be included in the device 200. Other example components (e.g., hardware, software) of computing devices are described in further detail below.

In some implementations, the data package is received by a back-end system (e.g., the back-end system 108 of FIG. 1), which processes the data package as part of a cognitive computing process. More particularly, and in accordance with the example context described above, the data package can be processed as part of a content review process within a cognitive computing environment. In some implementations, the provision of the secondary digital content provides for enhancement of the machine-learning component based on model selection, and/or feature selection.

In some implementations, the back-end system processes the data package to provide a checksum value (e.g., using the same checksum function as the device that provided the data package), and compares the checksum value to the received checksum value. If the checksum values are equal, the integrity of the digital content provided in the data package is determined to be intact, and the digital content can be used for the content review process. If the checksum values are not equal, the integrity of the digital content provided in the data package is determined to be compromised, and the digital content is not used for the content review process. In some examples, the back-end system can send a request to have the device resend the data package.

In some implementations, a model, and/or features of a model are selected based on the secondary digital content provided from one or more devices. For example, a model that accounts for (e.g., includes features relating to) the secondary digital content is selected from a plurality of models. In some examples, a model that accounts for the secondary digital content may be more accurate in performing content review than a model that does not account for the secondary digital content. As another example, a feature of a model can be accounted for during processing of the model, if secondary digital content corresponding to the feature is available. For example, a model is used in the content review process regardless of the secondary digital content that is provided. If secondary digital content corresponding to a feature of the model is provided, then the feature is processed as part of the content review process. If, however, secondary digital content corresponding to a feature of the model is not provided, then the feature is not processed as part of the content review process.

In some examples, efficiency of the machine-learning component can be enhanced based on model selection, and/or feature selection in view of the secondary digital content. For example, an amount of resources (e.g., processors, memory, communication bandwidth) required by the machine-learning component can be reduced. In some examples, accuracy of the machine-learning component can be enhanced based on model selection, and/or feature selection. For example, an accuracy (e.g., correct classifications versus incorrect classifications) can be increased.

Figure 3:
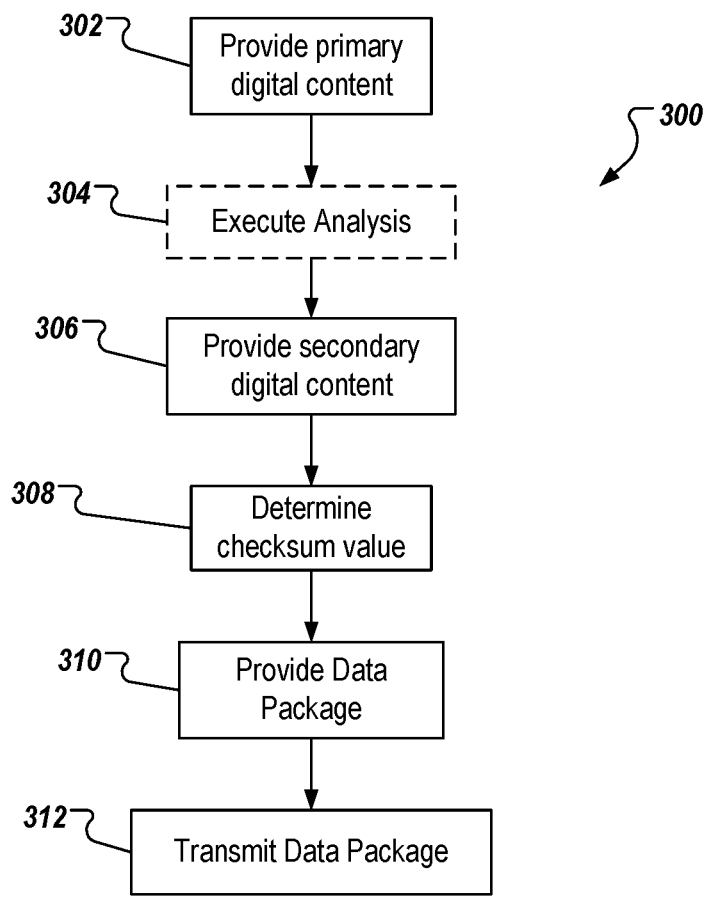
FIG. 3 depicts an example process that can be executed in implementations of the present disclosure.

FIG. 3 depicts an example process 300 that can be executed in implementations of the present disclosure. In some examples, the process 300 is executed by a device that provides data packages to a cognitive computing environment (e.g., the device 200 of FIG. 2).

Primary digital content is provided (302). For example, at least one sensor is activated to generate primary digital content (e.g., video, audio). The primary digital content is stored (e.g., in computer-readable/-writable memory of the device). Analysis is optionally performed (304). In some examples, analysis of the primary digital content can be performed to provide an output (e.g., facial detection, described above).

Secondary digital content is provided (306). The secondary digital content indicates a context, within which the primary digital content was generated. In some examples, at least one sensor is activated to generate secondary digital content (e.g., accelerometer, temperature, pressure). For example, the secondary digital content includes data reflecting an environment, within which the primary digital content was generated, and/or a condition of the device (e.g., movement of the device), when the primary digital content was generated. In some examples, device state data is retrieved from computer-readable memory of the device, the device state data indicating a state of the device when the primary digital content was generated, and at least a portion of the secondary digital content includes the device state data. In some examples, at least a portion of the secondary digital content includes the output of the analysis.

A checksum value is provided (308). In some examples, the checksum value is determined based on the primary digital content and the secondary digital content. For example, the primary digital content and the secondary digital content are provided as input to a checksum function. A data package is provided (310). In some examples, the data package includes the primary digital content and the secondary digital content. In some examples, the data package includes the checksum value. In some examples, the data package is provided as a computer-readable file. The data package is transmitted (312). For example, the device transmits the data package to a back-end system. In some examples, the back-end system executes a content review process in a cognitive computing environment based on the primary digital content and the secondary digital content. For example, one or more of a model and at least one feature of the model is selected for processing in the content review process based on the secondary digital content.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for enhancing digital content provided from devices, the method being executed by one or more processors and comprising:
providing, by a sensor of a device, primary digital content;
providing, by the device, secondary digital content, the secondary digital content indicating a context, within which the primary digital content was generated, and at least a portion of the secondary content comprising output of real-time analytic model processing of at least a portion of the primary digital content;
generating, by the device, a data package comprising the primary digital content and the secondary digital content; and
transmitting, by the device, the data package to a back-end system over a network.

2. The method of claim 1, further comprising generating a checksum value based on the primary digital content and the secondary digital content.

3. The method of claim 2, wherein the data package further comprises the checksum value.

4. The method of claim 1, further comprising retrieving device state data from computer-readable memory of the device, the device state data indicating a state of the device when the primary digital content was captured, and at least a portion of the secondary digital content comprising the device state data.

5. The method of claim 1, wherein the back-end system executes a content review process in a cognitive computing environment based on the primary digital content and the secondary digital content.

6. The method of claim 5, wherein one or more of a model and at least one feature of the model is selected for processing in the content review process based on the secondary digital content.

7. A non-transitory computer-readable storage medium coupled to one or more processors of a device and having instructions stored thereon which, when executed by the one or more processors, cause the one or more processors to perform operations comprising:
providing, by a sensor of the device, primary digital content;
providing, by the device, secondary digital content, the secondary digital content indicating a context, within which the primary digital content was generated, and at least a portion of the secondary content comprising output of real-time analytic model processing of at least a portion of the primary digital content;
generating, by the device, a data package comprising the primary digital content and the secondary digital content; and
transmitting, by the device, the data package to a back-end system over a network.

8. The computer-readable storage medium of claim 7, wherein operations further comprise generating a checksum value based on the primary digital content and the secondary digital content.

9. The computer-readable storage medium of claim 8, wherein the data package further comprises the checksum value.

10. The computer-readable storage medium of claim 7, wherein operations further comprise retrieving device state data from computer-readable memory of the device, the device state data indicating a state of the device when the primary digital content was captured, and at least a portion of the secondary digital content comprising the device state data.

11. The computer-readable storage medium of claim 7, wherein the back-end system executes a content review process in a cognitive computing environment based on the primary digital content and the secondary digital content.

12. The computer-readable storage medium of claim 11, wherein one or more of a model and at least one feature of the model is selected for processing in the content review process based on the secondary digital content.

13. A device, comprising:
a sensor;
one or more processors; and
a computer-readable storage device coupled to the one or more processors and having instructions stored thereon which, when executed by the one or more processors, cause the one or more processors to perform operations for modeling data, the operations comprising:
providing, by the sensor, primary digital content;
providing secondary digital content, the secondary digital content indicating a context, within which the primary digital content was generated, and at least a portion of the secondary content comprising output of real-time analytic model processing of at least a portion of the primary digital content;
generating a data package comprising the primary digital content and the secondary digital content; and
transmitting the data package to a back-end system over a network.

14. The device of claim 13, wherein operations further comprise generating a checksum value based on the primary digital content and the secondary digital content.

15. The device of claim 14, wherein the data package further comprises the checksum value.

16. The device of claim 13, wherein operations further comprise retrieving device state data from computer-readable memory of the device, the device state data indicating a state of the device when the primary digital content was captured, and at least a portion of the secondary digital content comprising the device state data.

17. The device of claim 13, wherein the back-end system executes a content review process in a cognitive computing environment based on the primary digital content and the secondary digital content.

* * * * *